United States Patent
Shoji et al.

(10) Patent No.: US 7,158,786 B2
(45) Date of Patent: Jan. 2, 2007

(54) RADIO BUS SYSTEM, RADIO COMMUNICATION APPARATUS AND REGISTRATION COMMUNICATION METHOD

(75) Inventors: Yoshitoshi Shoji, Chiba (JP); Koji Yamano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 132 days.

(21) Appl. No.: 10/221,979

(22) PCT Filed: Feb. 23, 2001

(86) PCT No.: PCT/JP01/01382

§ 371 (c)(1),
(2), (4) Date: Feb. 27, 2003

(87) PCT Pub. No.: WO01/69856

PCT Pub. Date: Sep. 20, 2001

(65) Prior Publication Data

US 2003/0162542 A1   Aug. 28, 2003

(30) Foreign Application Priority Data

Mar. 16, 2000  (JP) ............................. 2000-073589
Feb. 2, 2001   (JP) ............................. 2001-026551

(51) Int. Cl.
H04Q 7/20 (2006.01)
(52) U.S. Cl. ............................ 455/435.1; 455/435.2; 455/410; 455/411; 380/247; 713/168
(58) Field of Classification Search ......... 455/435.1–2, 455/466, 426.1, 410–411, 445, 555; 370/328, 370/465; 380/247; 713/168
See application file for complete search history.

(56) References Cited

U.S. PATENT DOCUMENTS 5,537,460 A * 7/1996 Holliday et al. ......... 455/435.1

(Continued)

FOREIGN PATENT DOCUMENTS

JP        11-308673        11/1999

(Continued)

OTHER PUBLICATIONS

Haartsen, J. C., "*The Bluetooth Radio System*", IEEE Personal Communications, IEEE Communications Society, vol. 7 No. 1, Feb. 2000, pp. 28-36.

(Continued)

*Primary Examiner*—George Eng
*Assistant Examiner*—Sharad Rampuria
(74) *Attorney, Agent, or Firm*—David G. Conlin; David A. Tucker; Edwards Angell Palmer & Dodge LLP

(57) ABSTRACT

A radio bus system, a radio communication apparatus and a registration communication method which can ensure a minimum level of secrecy even when radio is used during an authentication information registration procedure. A hub station and each terminal comprises a mode switching control circuit (10) for switching between two modes, one being a registration mode to be used for the transmission and reception of registration data, and the other being a normal mode to be used for the transmission and reception of general data other than the registration data, a scrambler (transmitter means) (22) for transmitting data after providing the data with predetermined data processing corresponding to the mode switched to, and a descrambler (receiver means) (27) for performing on received data a predetermined restoration process corresponding to the mode switched to. Restoration of the received data is enabled only when the mode on the transmitting end and that on the receiving end correspond with each other.

1 Claim, 13 Drawing Sheets

U.S. PATENT DOCUMENTS

| | | | | |
|---|---|---|---|---|
| 5,689,549 A | * | 11/1997 | Bertocci et al. | 455/463 |
| 5,926,760 A | * | 7/1999 | Khan et al. | 455/435.1 |
| 6,192,474 B1 | * | 2/2001 | Patel et al. | 713/171 |
| 6,246,696 B1 | * | 6/2001 | Yamaguchi et al. | 370/475 |
| 6,339,646 B1 | * | 1/2002 | Dahlman et al. | 380/273 |
| 6,366,585 B1 | * | 4/2002 | Dapper et al. | 370/409 |
| 6,385,453 B1 | * | 5/2002 | Foladare et al. | 455/445 |
| 6,564,056 B1 | * | 5/2003 | Fitzgerald | 455/435.1 |
| 6,650,616 B1 | * | 11/2003 | Crawford | 370/203 |
| 6,704,575 B1 | * | 3/2004 | Fujita | 455/462 |
| 6,782,260 B1 | * | 8/2004 | Nakakita et al. | 455/435.1 |
| 6,788,938 B1 | * | 9/2004 | Sugaya et al. | 455/435.1 |
| 2001/0021655 A1 | * | 9/2001 | Maeshima | 455/507 |
| 2002/0058502 A1 | * | 5/2002 | Stanforth | 455/422 |

FOREIGN PATENT DOCUMENTS

| | | |
|---|---|---|
| JP | 11-355279 | 12/1999 |
| JP | 2000-031980 | 1/2000 |

OTHER PUBLICATIONS

Chen, Allen C. Dr., *"Overview of Code Division Multiple Access Technology for Wireless Communications"*, Industrial Electronics Society, 1998, pp. T15-T24.

* cited by examiner

RADIO BUS SYSTEM, RADIO
COMMUNICATION APPARATUS AND
REGISTRATION COMMUNICATION
METHOD

TECHNICAL FIELD

The present invention relates to a radio bus system in which an IEEE (Institute of Electrical and Electronics Engineers) 1394 serial bus comprising a hub station and a plurality of terminals is wirelessly configured, a radio communication apparatus and a registration communication method. More particularly, the present invention relates to a radio bus system, a radio communication apparatus and a registration communication method for allowing a procedure for registering a terminal to the radio bus system to be performed secretly.

BACKGROUND ART

There has been a trend in recent years to build a household or suburban network by using the IEEE1394 serial bus as a means of transferring video or picture data for digital household electric appliances.

While devices complying with the IEEE1394 bus are connected by wires such as cables, wiring of the cables is now a big problem as a result of the increase in the number of devices that can be connected. Accordingly, there is a growing demand for the capability to transfer, by radio, multimedia data with the same performance as that obtainable by the IEEE1394 bus (see Japanese Patent Application Laid-Open (Kokai) No. 11-355279, for example).

FIG. 14 shows a wireless configuration of the IEEE1394 serial bus. As shown, a radio bus system 21 is made up of a plurality of terminals 23a, 23b, 23c, . . . , and a hub station 22 that controls the terminals.

The hub station 22 controls the radio bus system 21 while exchanging control information with the terminals 23a, 23b, 23c, . . . which the hub station is responsible for in the radio bus system 21, so that data can be transmitted and received among the terminals.

FIG. 15 shows a block diagram of the terminal and the hub station in a radio bus system according to the prior art, schematically showing an example of the configuration of the terminal and the hub station for conducting radio communication in the radio bus system 21. The following description is based on the assumption that the terminal and the hub station according to the present embodiment have an identical configuration and use the OFDM (orthogonal frequency division multiplex) system.

The OFDM system is a multicarrier transmission system in which transfer data is modulated on a plurality of carrier waves (to be hereafter referred to as subcarriers) and then transmitted. Since this multiplexing system is effective in preventing influences on a delay wave, it has been increasingly adopted for radio communication purposes in recent years.

In FIG. 15, the terminal or hub station comprises a transmitter and a receiver.

The transmitter will be hereafter described. Data to be transmitted is input to an input terminal 1. A scrambler 2 carries out a scrambling process whereby the energy of transmission data is spread.

A Pre-IFFT processing circuit 4 performs an error correcting coding process, an interleaving process for improving error correcting performance, and a mapping process for performing multilevel modulation such as QPSK, 16QAM and 64QAM. A quantity of data necessary for the subsequent input to the IFFT circuit 5 is accumulated by a serial/parallel (S/P) converter.

The IFFT (inverse fast Fourier transform) circuit 5 provides subcarrier modulation to the transmission data. Data output from the IFFT circuit 5 is multiplied with a reception signal in an orthogonal demodulator 12 on the receiver end and then input to a preamble attachment circuit 6 for attaching a particular series (to be hereafter referred to as a preamble) which is used for the reproduction of the carrier.

The preamble is stored in a memory 3 in advance. The preamble attachment circuit 6 attaches the preamble output from the memory 3 to the head of the output of the IFFT circuit 5, before the output is fed to an orthogonal modulator 7. The orthogonal modulator 7 converts the output into an IF signal by using the carrier generated by a carrier generating circuit 8, and outputs the IF signal via an output terminal 9.

Next, the receiver will be described. The IF signal is input to an input terminal 11. An orthogonal demodulator 12 multiplies the input signal with a complex carrier which is output by a carrier reproduction circuit 13 to thereby convert the IF signal into a base band signal and outputs it to a synchronizing circuit 14.

FIG. 16 shows a block diagram of the synchronizing circuit 14. As shown, an input signal 32 is initially input to a preamble detection circuit 31. In the preamble detection circuit 31, correlation with a preamble signal 33 which is output from the memory 18 on the receiver end and which is identical to the one on the transmitter end is determined in a correlator 34. The result of correlation is judged in a decision unit 35 to detect the preamble portion.

If detected, the preamble portion is input to a frequency error detection circuit 36 and a phase error detection circuit 37, from which a frequency error signal 38 and a phase error signal 39 are derived. These results are sent to the carrier reproduction circuit 13 and are reflected in the orthogonal demodulator 12.

In an FFT (fast Fourier transform) circuit 15, the base band signal is subcarrier-demodulated. The resultant output is fed to a post-FFT processing circuit 16, where a parallel-serial (P/S) conversion processing, a demapping process for carrying out multilevel demodulation processes, a deinterleaving process, and an error correcting decoding process are performed.

Finally, the original data is reproduced by a descrambler 17, which corresponds to the scrambler 2 on the transmitter end, and is output to an output terminal 19.

Since the IEEE1394 serial bus generally had a wired configuration, there has been no need to validate the authenticity of a cable-connected terminal.

However, when the IEEE1394 bus is to be configured by radio, there are chances that a terminal participates against the expectation of the users of the radio bus system, or that a user participates in the radio bus system by mistake.

In order to prevent these problems, a procedure known as authentication must be provided whereby a terminal wishing to participate in the radio bus system notifies the hub station of a request for participation so that the hub station can authenticate the terminal based on some kind of information.

For authentication, the information must be shared between the terminal and the hub station in advance. Specifically, the terminal to be connected to the radio bus system must register in advance its information to the hub station which controls the radio bus system. If security is a priority, the exchange of information in this registration procedure should preferably be carried out via a separate route from the radio route on which data communication takes place, such as a cable or a floppy disc.

However, to register via a separate route from radio requires additional components and this directly results in increased costs. Furthermore, if radio is employed, secrecy at the time of registration must be ensured. The possibility of unauthorized use arises when, in the case of FIG. 14, for example, a terminal transmits its terminal information to the hub station for registration purposes because the other terminals could eavesdrop on the transmitted radio data even if they did not have the intention of doing so.

In view of these problems of the prior art, it is an object of the present invention to provide a radio bus system, a radio communication apparatus and a registration communication method in which a minimum level of secrecy can be ensured even when radio is employed in the procedure for registering authentication information.

SUMMARY OF THE INVENTION

A radio bus system according to the present invention comprises a hub station and a plurality of terminals, the hub station and the terminals communicating with each other by radio, wherein the hub station and each terminal each comprise: a mode switching means for switching between two modes, one being a registration mode which is used for the transmission and reception of registration data and the other being a normal mode which is used for the transmission and reception of general data other than the registration data; a transmitter means for transmitting data after providing it with predetermined data processing corresponding to the mode switched to; and a receiver means for performing a predetermined restoration process on received data corresponding to the mode switched to, wherein restoration of the received data is enabled only when the mode on the transmitting end and that on the receiving end correspond with each other.

In a radio bus system according to the present invention, the transmission means comprises two scramblers for scrambling transmission data, one for the registration mode and the other for the normal mode and the reception means comprises two descramblers for restoring reception data, one for the registration mode and the other for the normal mode, wherein one of the scramblers or descramblers is selected by the mode switching means.

In a radio bus system according to the present invention, the transmission means and the reception means comprise a memory in which two preambles for carrier reproduction, one for the registration mode and the other for the normal mode, are stored, and wherein either preamble is selected by the mode switching means and is either attached to the transmission data or used for detecting the preamble of the reception data.

In a radio bus system according to the present invention, the registration mode comprises a plurality of registration sub-modes, and the mode switching means comprises a registration sub-mode designation means, the mode switched to comprising the normal mode and individual registration sub-modes.

A radio bus system according to the present invention comprises a radio transmitter apparatus and one or more radio receiver apparatuses, wherein the radio transmitter apparatus comprises a plurality of scramblers and preambles, the transmitter apparatus further comprising: a selection means for selecting the plurality of scramblers and preambles; and a transmitter means for transmitting by performing predetermined data processing corresponding to a selected scrambler and preamble, wherein the radio receiver apparatus comprises a plurality of descramblers and preambles the receiver apparatus further comprising: a selection means for selecting the plurality of descramblers and preambles; and a receiver means for performing a predetermined restoration process on received data in accordance with the selected descrambler and preamble, wherein communication of data is enabled only when the scrambler and preamble selected in the radio transmitter apparatus correspond with the descrambler and preamble selected in the radio receiver apparatus.

A radio communication apparatus according to the present invention which is used as a hub station or a terminal in a radio bus system comprising a hub station and a plurality of terminals, wherein communication between the hub station and the terminals is performed by radio, the apparatus comprising: a mode switching means for switching between two modes, one being a registration mode which is used for the transmission and reception of registration data and the other being a normal mode which is used for the transmission and reception of general data other than the registration data; a transmitter means for transmitting data after performing predetermined data processing on the data corresponding to the mode switched to; and a receiver means for performing a predetermined restoration process on received data corresponding to the mode switched to.

In a radio communication apparatus according to the present invention, the mode switching means comprises a registration sub-mode designation means, the apparatus further comprising: a transmitter means for transmitting data after performing predetermined data processing corresponding to the mode switched to by the mode switching means and the registration sub-mode designation means; and a receiver means for performing a predetermined restoration process on received data corresponding to the mode switched to.

A radio communication apparatus according to the present invention further comprises: a plurality of scrambling means and preamble patterns; a selection means for selecting the plurality of scramble means and preamble patterns; a transmitter means for transmitting by performing predetermined data processing corresponding to a selected scramble means and preamble pattern; and a receiver means for performing a predetermined restoration process on received data according to the selected scramble and preamble.

The present invention further provides a registration communication method for performing a procedure for registering a terminal to a radio bus system comprising a hub station and a plurality of terminals, wherein communication between the hub station and the terminals is conducted by radio, the method comprising the steps of: setting the terminal and the hub station to a registration mode; transmitting, in the registration mode, a registration mode change completion notification to the terminal from the hub station; transmitting, in the registration mode, terminal registration information to the hub station from the terminal which received the registration mode change completion notification; performing a registration procedure, based on the terminal registration information, in the hub station after its reception of the terminal registration information; transmitting, in the registration mode, a registration procedure completion notification from the hub station to the terminal; setting the terminal to a normal mode after the terminal, having received the registration procedure completion notification, transmitted acknowledgement data to the hub station in the registration mode; and setting the hub station, upon receiving the recognition data, to the normal mode.

BEST MODE FOR CARRYING OUT THE INVENTION

Hereafter, preferred embodiments of the radio bus system, radio communication apparatus and registration communication method according to the present invention will be described in detail by referring to the attached drawings.

Embodiment 1

Figure 1:
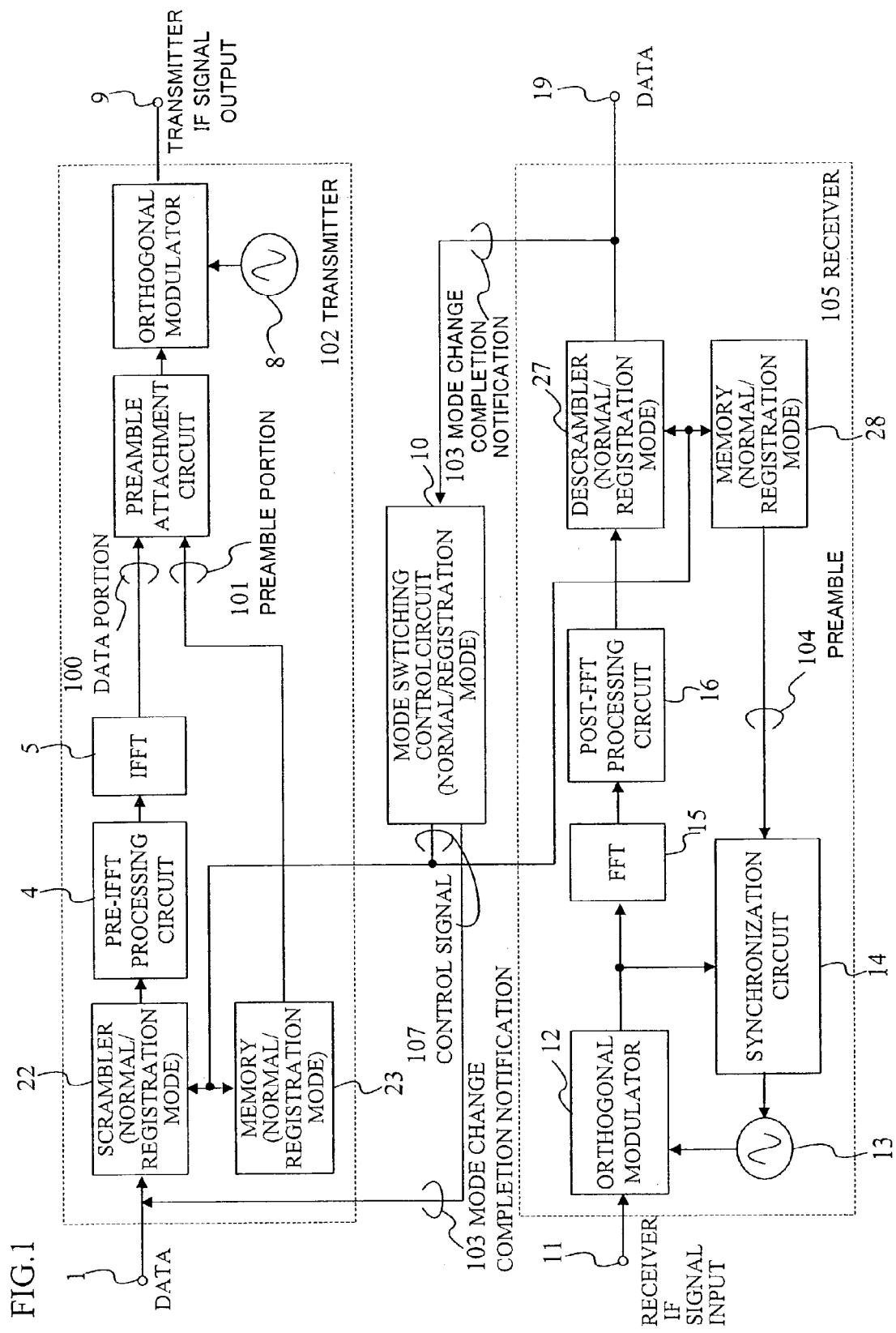
FIG. 1 shows a block diagram of a terminal and a hub station in a radio bus system according to a first embodiment of the present invention.
Figure 14:
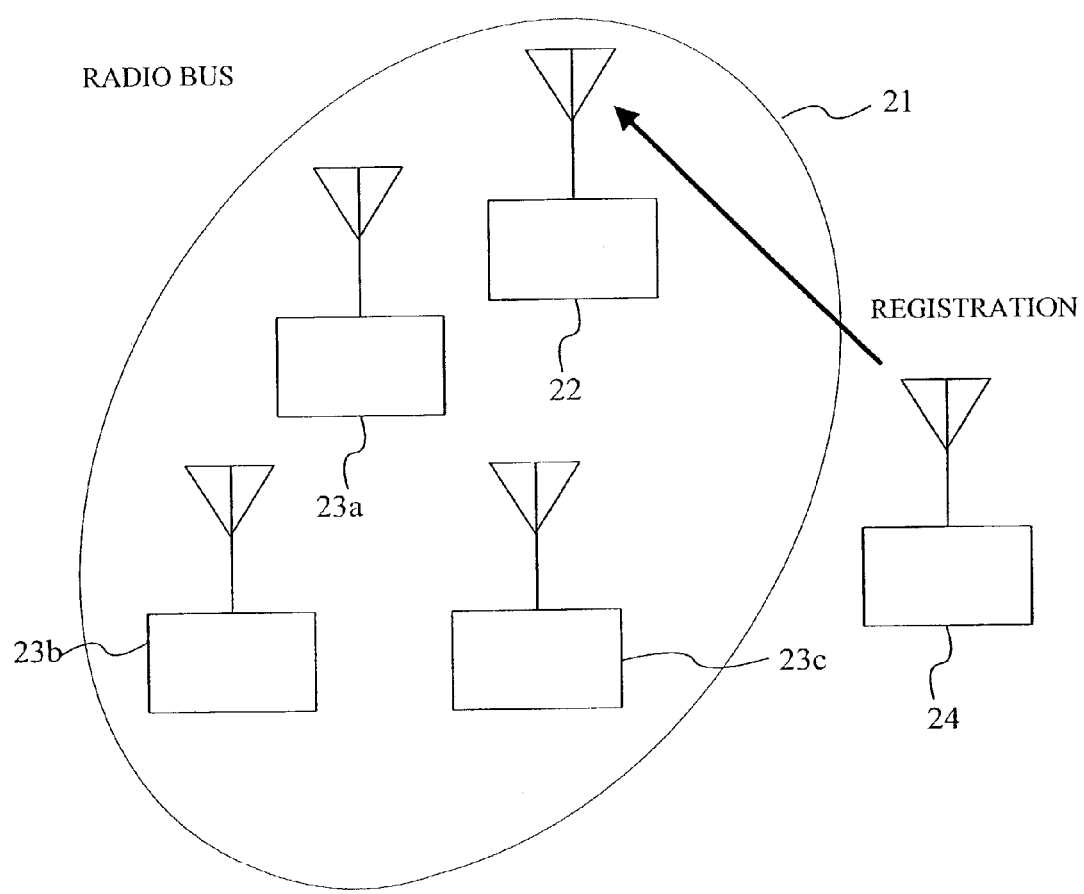
FIG. 14 is a drawing for the explanation of the concept of a radio bus system.
Figure 15:
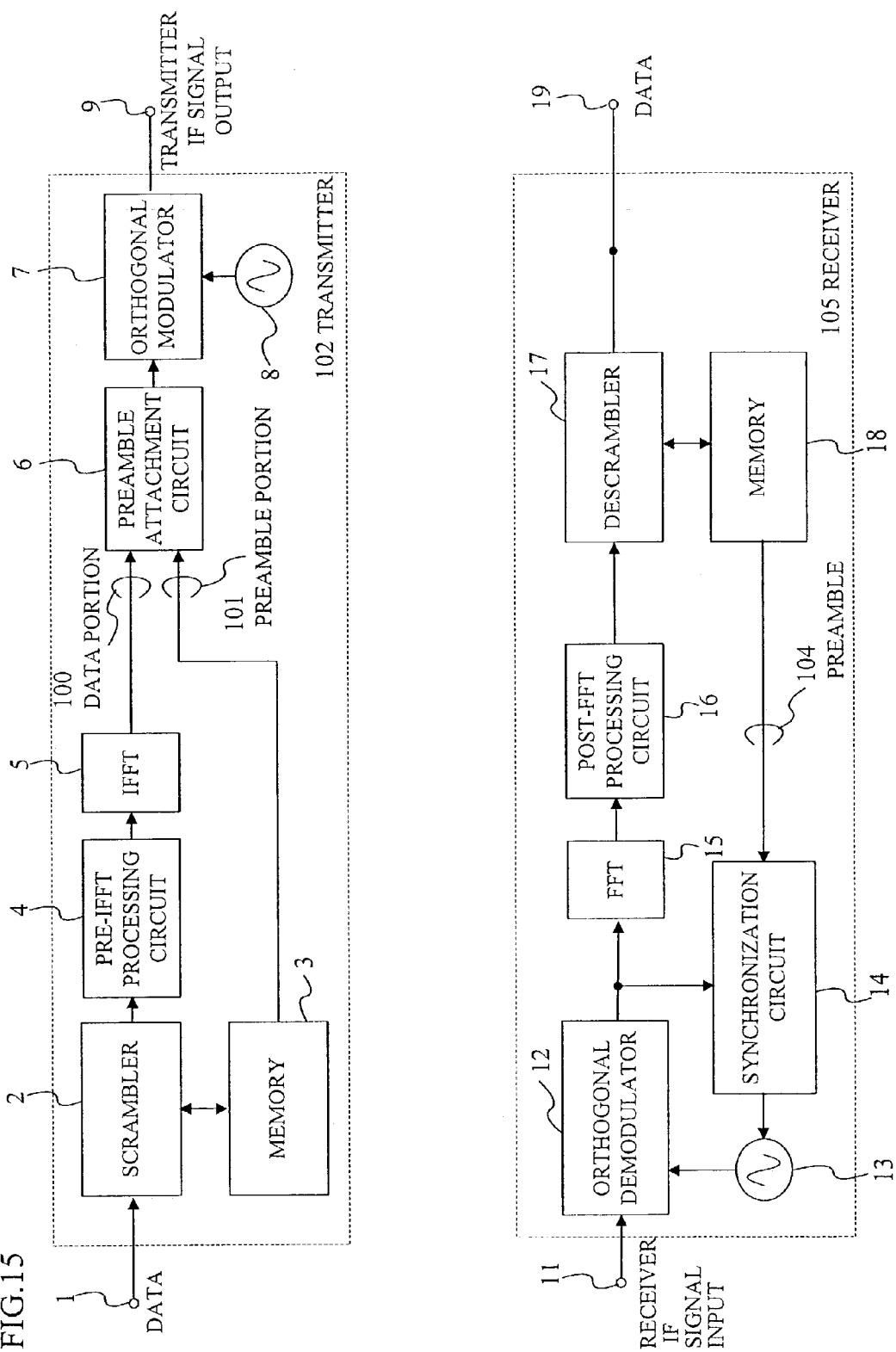
FIG. 15 shows a block diagram of a terminal and a hub station in a radio bus system according to the prior art.
Figure 16:
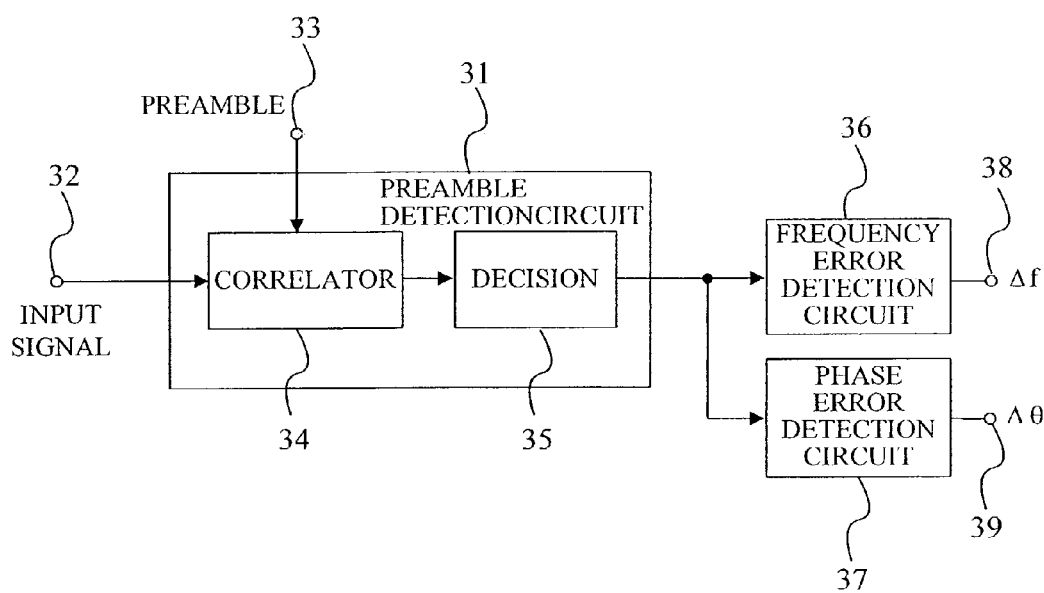
FIG. 16 shows a block diagram of a synchronizing circuit in the radio bus system according to the prior art.

FIG. 1 schematically shows the configuration of a terminal and a hub station in a radio bus system according to a first embodiment of the present invention. This is an example where the present invention is applied to a radio bus system based on OFDM (orthogonal frequency division multiplex). Elements or components similar to those of the conventional example shown in FIGS. 14 to 16 are designated by similar numerals for simplicity's sake.

The terminal and the hub station in the radio bus system according to this embodiment have an identical configuration, each comprising a transmitter, a receiver, and a mode switching control circuit.

The terminal and the hub station in the present embodiment each have two operation modes, i.e., a registration mode and a normal mode. The registration mode is used when the terminal is initially registered with the radio bus system. For registration of a new terminal, both the terminal seeking registration on the transmitting end and the hub station on the receiving end are set to the registration mode.

After a procedure for registration with the radio bus system is complete, the terminal on the transmitting end and the hub station on the receiving end are switched to the normal mode. In the normal mode, general data in the radio bus system can be transmitted and received. The normal and registration modes are not activated simultaneously.

Hereafter, the structure of the transmitter will be described. The transmitter in the present embodiment comprises a scrambler 22 (transmitter means) having two scramblers, one for the registration mode and the other for the normal mode, and a memory 23 having two preambles, one for the registration mode and the other for the normal mode. Other parts of the structure are similar to those of the conventional transmitter shown in FIG. 15.

Figure 2:
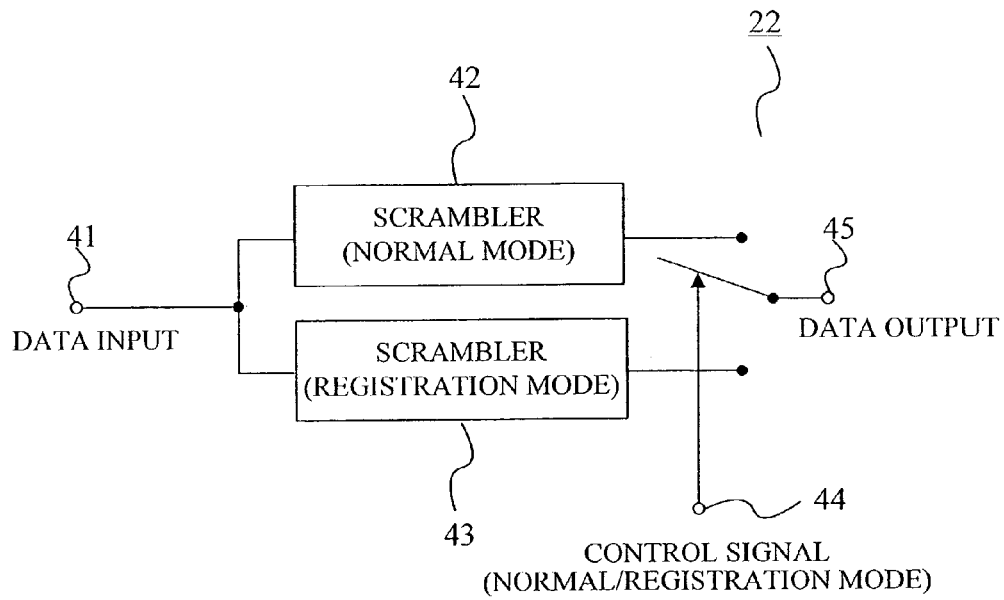
FIG. 2 shows a block diagram of a scrambler in the radio bus system according to the first embodiment.

FIG. 2 shows a block diagram of an example of the scrambler 22. As shown, the scrambler 22 comprises a data input terminal 41, a scrambler 42 for the normal mode, a scrambler 43 for the registration mode and a data output terminal 45.

Transmission data fed to the data input terminal 41 is input to the normal-mode scrambler 42 and the registration-mode scrambler 43. The output of one of the scramblers 42 and 43 is selected by a normal/registration mode selection signal, which is received via a control signal input terminal 44. The selected output is output to the data output terminal 45.

Specifically, the scrambler 22 selects, based on the mode selection signal from the mode switching control circuit 10 (mode switching means), the transmission data on which a scrambling process has been performed by either one of the scramblers 42 and 43 and therefore having its energy spread, and outputs the selected data to the pre-IFFT processing circuit 4.

To the scrambler 22 is also input a mode change completion notification signal from the mode switching control circuit 10. This signal, which will be described later, is processed in preference to the data fed from the input terminal 1.

Figure 3:
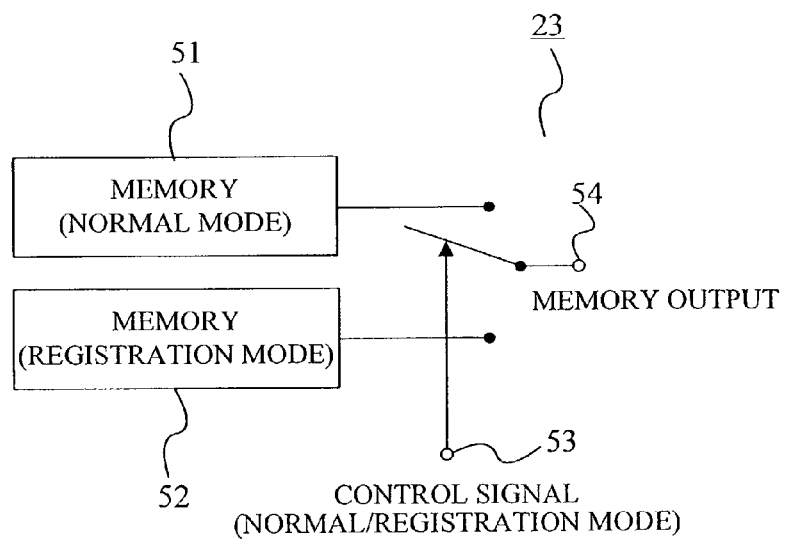
FIG. 3 shows a block diagram of a memory in the radio bus system according to the first embodiment.

FIG. 3 shows a block diagram of an example of the memory 23. As shown, the memory 23 comprises a memory 51 for storing a preamble for the normal mode, a memory 52 for storing a preamble for the registration mode, a control signal input terminal 53 and an output terminal 54.

In the memory 23, the output of either the memory 51, in which the preamble for the normal mode is stored, or the memory 52, in which the preamble for the registration mode is stored, is selected by a normal/registration mode selection signal received via a control signal input terminal 53. The selected output is output to the output terminal 54.

Namely, the memory 23 first selects, based on the mode selection signal from the mode switching control circuit 10, the preamble stored in either the memory 51 or 52 and then outputs the selected preamble to the preamble attachment circuit 6.

Hereafter, the structure of the receiver will be described. The receiver in the present embodiment comprises a descrambler 27 (receiver means) having two descramblers, one for the registration mode and the other for the normal mode, and a memory 28 in which two preambles, one for the registration mode and the other for the normal mode, are stored. Other parts of the structure are similar to those of the conventional receiver shown in FIG. 15.

Figure 4:
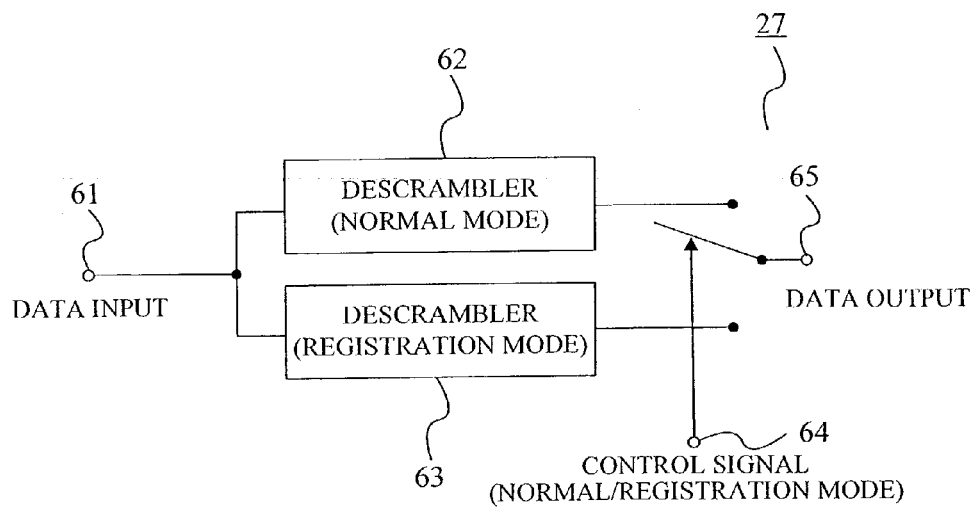
FIG. 4 shows a block diagram of a descrambler in the radio bus system according to the first embodiment.

FIG. 4 shows a block diagram of an example of the descrambler 27. As shown, the descrambler 27 comprises a data input terminal 61, a descrambler 62 for the normal mode, a descrambler 63 for the registration mode, a control signal input terminal 64 and a data output terminal 65.

Received data fed to the data input terminal 61 is input to the descrambler 62 for the normal mode and the descrambler 63 for the registration mode. The output of either the descrambler 62 or 63 is selected by a normal/registration mode selection signal received via the control signal input terminal 64. The selected output is output to the data output terminal 65.

More precisely, the descrambler 27 selects, based on the mode selection signal from the mode switching control circuit 10, the data on which a descrambling process has been performed by either the descrambler 62 or 63, and outputs the selected data to the output terminal 19.

If the mode on the receiving end and that on the transmitting end are identical, this means that the descrambler used on the receiving end corresponds to that used on the transmitting end, so that the original signal can be restored. If the modes are different, the descrambler used on the receiving end does not correspond to the one used on the transmitting end, so that the data cannot be restored.

The memory 28 has the same structure as the memory 23 on the transmitting end shown in FIG. 3. It selects the preamble for either the registration or normal mode based on the mode selection signal from the mode switching control circuit 10, and outputs the selected preamble to the synchronizing circuit 14.

In the case where the mode on the receiving end is identical to that on the transmitting end, a high correlation appears in a correlator 34 (see FIG. 16) in the synchronizing circuit 14 when the preamble portions correspond, so that the preamble portion can be detected. By using this preamble portion, a frequency error detection circuit 36 and a phase error detection circuit 37 output a frequency error signal 38 and a phase error signal 39, respectively.

However, if the mode on the receiving end is different from that on the transmitting end, no portion with a high correlation appears in the correlator 34 in the synchronization circuit 14, so that the preamble portion is not detected. Thus, the frequency and phase errors cannot be determined and the reception data cannot be correctly demodulated.

Hereafter, the mode switching control circuit 10 will be described.

Figure 5:
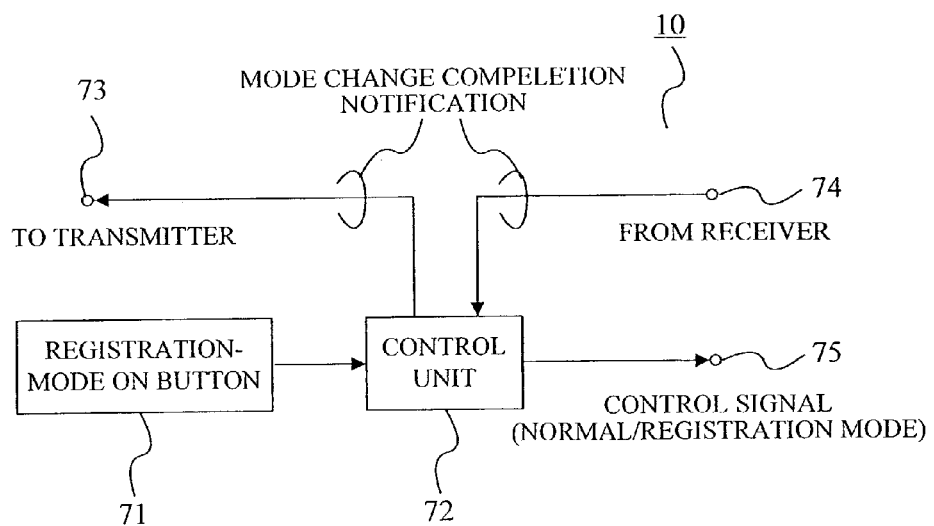
FIG. 5 shows a block diagram of a mode switching control circuit in the radio bus system according to the first embodiment.

FIG. 5 shows a block diagram of an example of the mode switching control circuit 10. As shown, the mode switching control circuit 10 comprises a registration mode ON button 71, a control unit 72, input and output terminals 73 and 74 for the input and output of a mode conversion completion notification signal, and a control signal output terminal 75 for the output of a normal/registration mode switching control signal.

As the registration mode ON button 71 is depressed, the relevant terminal or hub station is set to the registration mode by the control unit 72.

While in this example the mode switching control circuit 10 is provided with the registration mode ON button 71, a changeover switch for selecting between the registration and normal mode may be provided so that the user can perform the mode switching operation.

The control unit 72 transmits a mode control signal to the scrambler 22, descrambler 27, and memories 23 and 28 in its own station, as well as transmitting and receiving signals relating to mode switching to and from an opposite station. The mode switching signal is transmitted to the opposite station at regular intervals.

Hereafter, the operation of the radio bus system configured as described above will be described.

The steps to be taken for controlling the registration procedure in the control unit 72 of a terminal to be registered and a hub station will be described by referring to the flowchart of FIG. 6.

Figure 6:
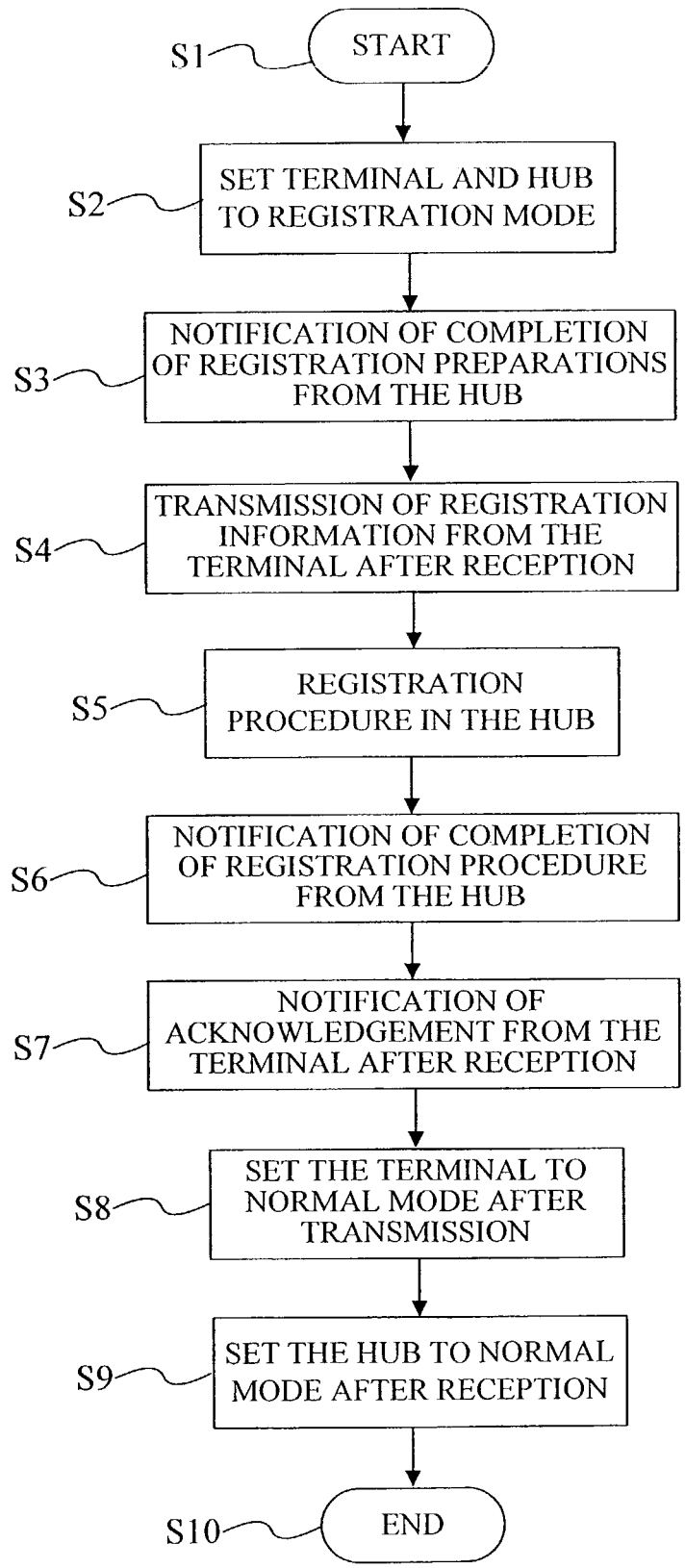
FIG. 6 shows a flowchart of an operation procedure in a control unit of the radio bus system according to the first embodiment.

In the flowchart of FIG. 6 showing the operation steps performed in the control unit 72, S refers to each step of the flow.

It is now assumed that the initial state of the terminal and of the hub station is the normal mode.

The procedure in the control unit 72 is initiated when a user of the terminal depresses the registration mode ON button 71 in both the terminal to be registered and the hub station (step S1). The control unit 72 transmits a control signal for the registration mode to the scrambler 22, descrambler 27 and memories 23 and 28 in its own station, thereby activating the registration mode (step S2).

The hub station, when set to the registration mode, transmits a signal notifying the terminal that its mode has been changed to the registration mode, thus indicating to the terminal that preparations for registration of the terminal have been made (step S3).

The terminal, now in the registration mode, restores that signal and, as the signal is received by the mode switching control circuit 10, transmits its terminal information to the hub station in the registration mode (step S4).

The hub station restores the terminal information in the registration mode, and performs a registration procedure (step S5). After completing the registration procedure, the hub station transmits a signal to the terminal in the registration mode, notifying it of the completion of the registration procedure (step S6).

The terminal restores the signal in the registration mode and, as the signal is received by the mode switching control circuit 10, transmits an acknowledgement packet to the hub station in the registration mode (step S7).

The terminal further transmits a control signal for the normal mode to the scrambler 22, descrambler 27 and memories 23 and 28 in the transmitter and receiver of the terminal, thereby setting the terminal to the normal mode (step S8).

The hub station restores this signal in the registration mode and, after receiving the restored signal in the mode switching control circuit 10, is set to the normal mode (step S9), and thus the registration procedure ends (step S10).

Thus, the present embodiment allows the procedure for registering a terminal with the radio bus to be automatically performed with minimum registration operations.

As described above, the present embodiment comprises the mode switching control circuit 10 for switching between the registration and normal modes in each of the terminals and the hub station in the radio bus system, wherein restoration of received data is possible only when the mode of the hub station and that of the terminal correspond. Thus, a communication apparatus where a high level of secrecy is ensured can be provided.

Further, the use of two scramblers and two descramblers for the registration and normal modes, which are normally used for energy spreading purposes in the OFDM system, allows the mode to be identified by a simple arrangement.

Furthermore, by providing two preambles for the registration and normal modes in the preamble generating circuit, which is used for frequency synchronization in the OFDM system, a similar secrecy effect can be obtained.

Embodiment 2

In Embodiment 1, a communication apparatus with superior secrecy capabilities can be provided. However, since the first embodiment has only two modes that can be switched, the combination of the scrambler, descrambler and the memory storing the preamble in the registration mode is uniquely determined, so that it may be impossible to eliminate a terminal displaying malicious intent and standing by in the registration mode. In Embodiment 2, a plurality of sub-modes are provided in the registration mode, in order to provide a radio bus system in which a malicious terminal can be eliminated reliably by selecting the same sub-mode between transmission and reception.

Figure 7:
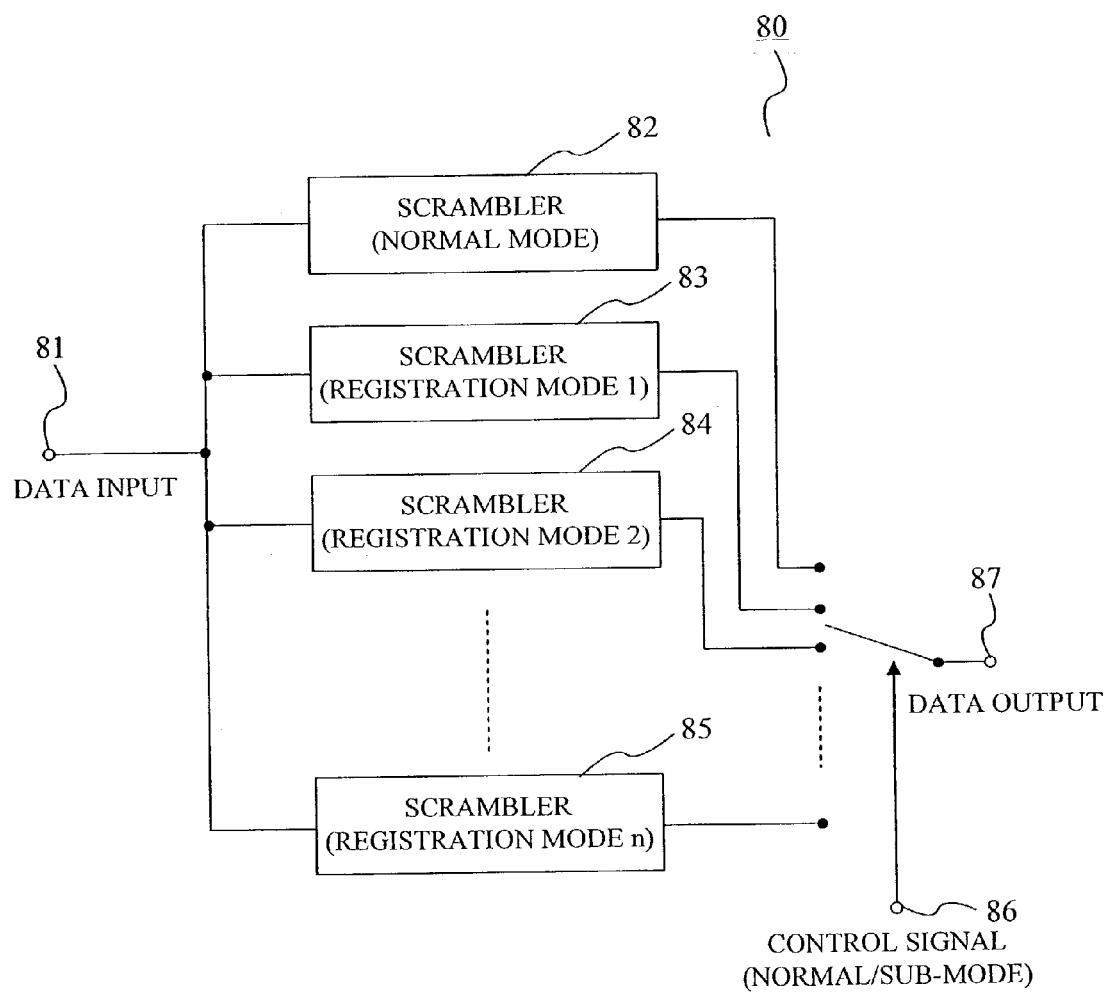
FIG. 7 shows a block diagram of a scrambler in a radio bus system according to a second embodiment of the present invention.

FIG. 7 shows an example of the scrambler 80 in the radio bus system according to Embodiment 2. The scrambler 80 is used in place of the scrambler 22 in the radio bus system shown in FIG. 1.

As shown in FIG. 7, the scrambler 80 (transmitting means) comprises a data input terminal 81, a scrambler 82 for the normal mode, a plurality of scramblers 83, 84 and 85 for the registration mode, a control signal input terminal 86 and a data output terminal 87.

Transmission data fed to the data input terminal 81 is input to the scrambler 82 for the normal mode and the plurality of scramblers 83, 84 and 85 for the registration mode. The output of one of the scramblers is selected by a selection signal sent via the control signal input terminal 86, and the selected output is output to the data output terminal 87.

Namely, the scrambler 80 selects, based on the control signal from the mode switching control circuit 10, the transmission data on which a scrambling process has been performed by one of the scramblers 82, 83, 84, and 85 and thus having its energy spread, and outputs the data to the pre-IFFT processing circuit 4.

The scrambler 80 also receives a mode switching completion notification signal from the mode switching control circuit 10. This signal is processed in preference to the data input via the input terminal 81.

Figure 8:
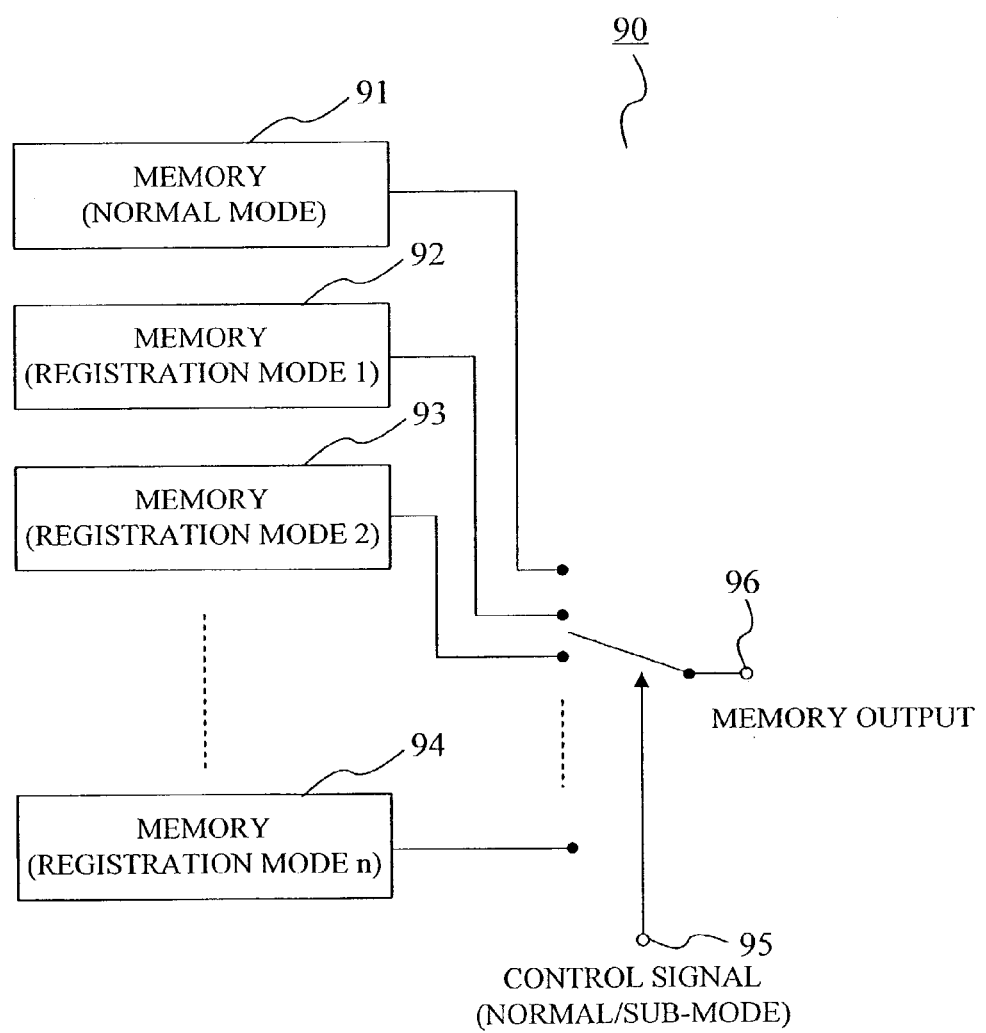
FIG. 8 shows a block diagram of a memory in the radio bus system according to the second embodiment.

FIG. 8 shows a block diagram of an example of a memory 90 in the radio bus system according to the present embodiment. The memory 90 is used in place of the memory 23 in the radio bus system shown in FIG. 1.

As shown in FIG. 8, the memory 90 comprises a memory 91 for storing a preamble for the normal mode, memories 92, 93 and 94 for storing a plurality of preambles for the registration mode, a control signal input terminal 95 and an output terminal 96.

In the memory 90, the output of either the memory 91 for storing the preamble for the normal mode or any one of the memories 92, 93 and 94 storing a plurality of preambles for the registration mode is selected by a selection signal sent via the control signal input terminal 95, and the selected output is output to the output terminal 96.

Specifically, the memory 90 selects, based on the selection signal from the mode switching control circuit 10, one of the preambles stored in the memory 91 or memories 92, 93 and 94, and outputs the selected output to the preamble attachment circuit 6.

Figure 9:
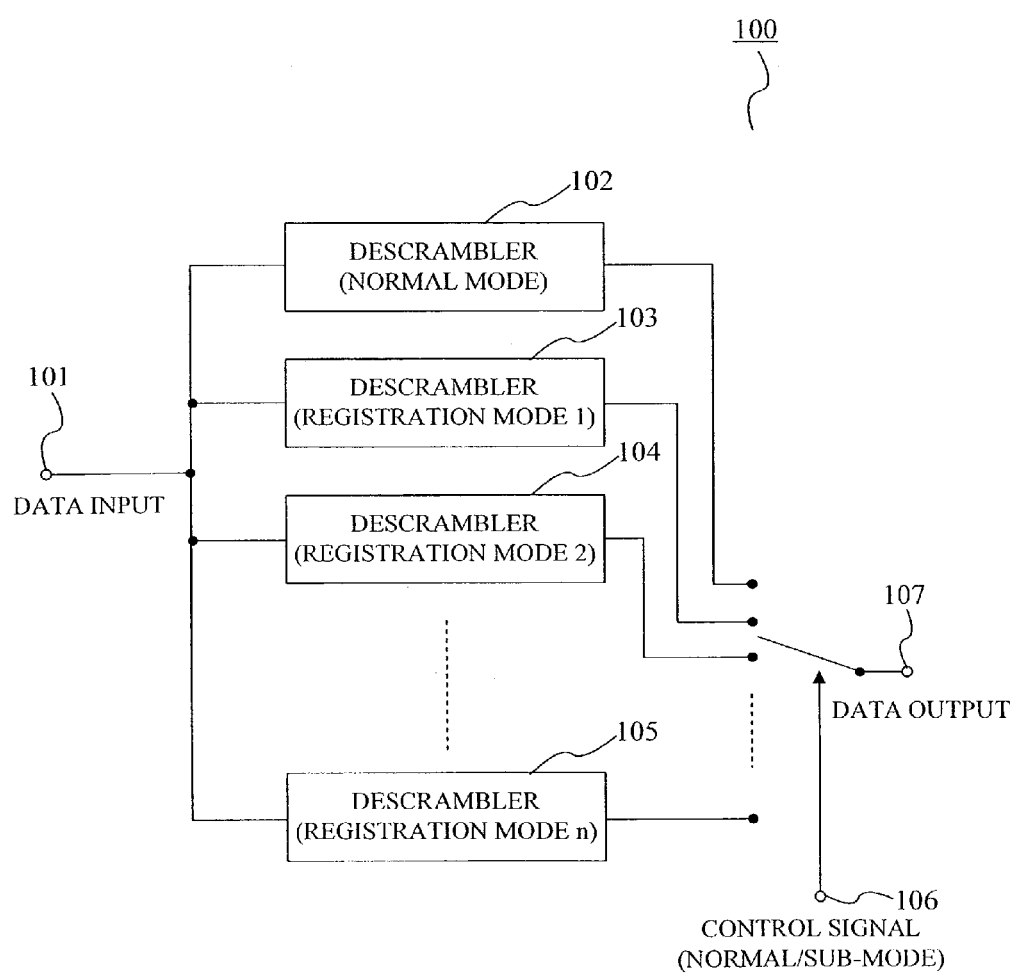
FIG. 9 shows a block diagram of a descrambler in the radio bus system according to the second embodiment.

FIG. 9 shows a block diagram of an example of a descrambler 100 in the radio bus system according to the present embodiment. The descrambler 100 is used in place of the descrambler 27 in the radio bus system shown in FIG. 1.

As shown in FIG. 9, the descrambler 100 (receiving means) comprises a data input terminal 101, a descrambler 102 for the normal mode, a plurality of descramblers 103, 104, and 105 for the registration mode, a control signal input terminal 106 and a data output terminal 107.

Received data fed to the data input terminal 101 is input to the descrambler 102 for the normal mode and the plurality of descramblers 103, 104, and 105 for the registration mode. One of the outputs of the descramblers 102, 103, 104 and 105 is selected by a selection signal sent via the control signal terminal 106, and the selected output is output to the output terminal 107.

Namely, the descrambler 100 selects, based on the control signal from the mode switching control circuit 10, the data on which a signal processing has been performed by one of the descramblers 102, 103, 104 and 105, and outputs the selected data to the output terminal 19.

Figure 10:
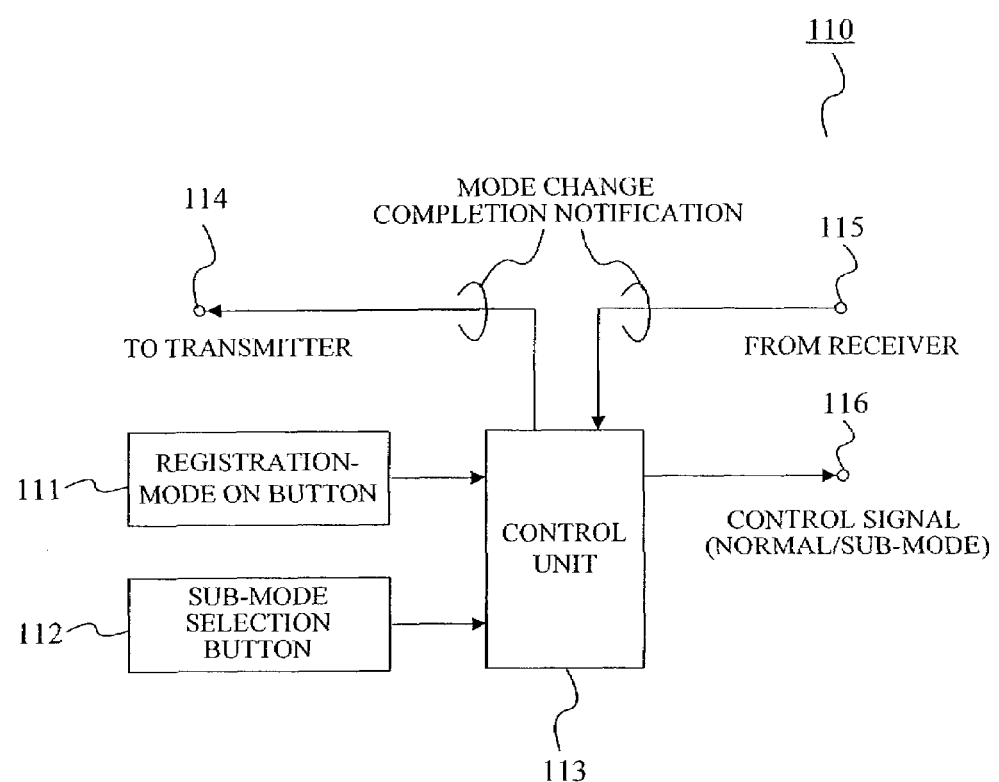
FIG. 10 shows a block diagram of a mode switching control circuit in the radio bus system according to the second embodiment.

FIG. 10 shows an example of the configuration of a mode switching control circuit 110 in the radio bus system according to the present embodiment. The mode switching control circuit 110 is used in place of the mode switching control circuit 10 in the radio bus system shown in FIG. 1.

As shown in FIG. 10, the mode switching control circuit 110 (mode switching means) comprises a registration mode ON button 111, a sub-mode selection button 112, a control unit 113, input and output terminals 114 and 115 for the input and output of a mode change completion notification signal, and a control signal output terminal 116 for the output of a normal/registration mode switching control signal.

One of a plurality of registration sub-modes is selected by the sub-mode selection button 112. As the registration mode ON button 111 is depressed, a control signal is output to the control signal output terminal 116 from the control unit 113, whereby the terminal or the hub station is set to a selected sub-mode of the registration mode.

In this example, the registration mode ON button 111 and the sub-mode selection button are provided, but a changeover switch for selecting each mode may also be provided.

Hereafter, the operation of the radio bus system constructed as described above will be described.

The control steps of the registration procedure in the control unit 113 of the terminal to be registered and the hub station will be described by referring to the flowchart of FIG. 11.

Figure 11:
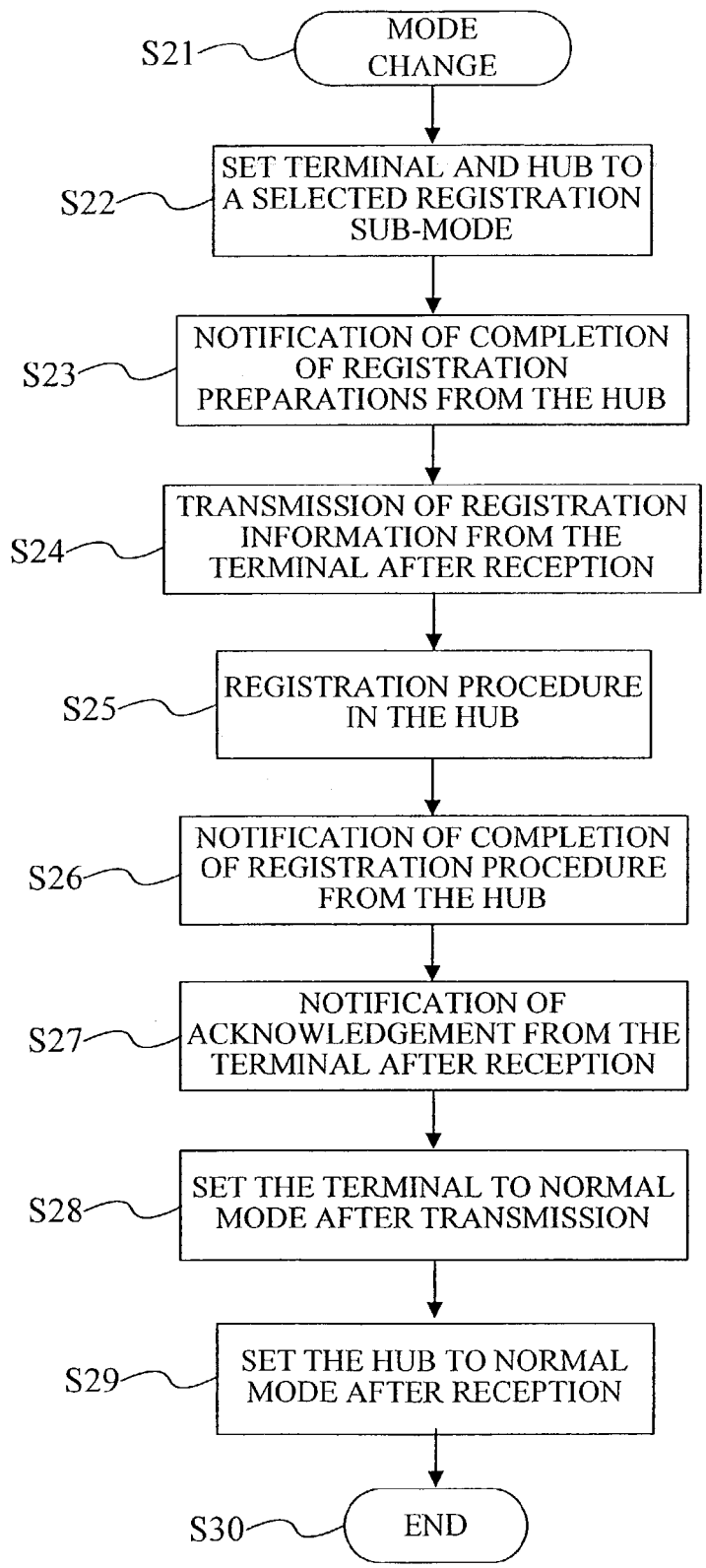
FIG. 11 shows a flowchart of an operation procedure in a control unit of the radio bus system according to the second embodiment.

FIG. 11 shows the flowchart of the operation steps in the control unit 113.

It is assumed that the initial state of the terminal and the hub station is the normal mode.

First, the user of the terminal selects a sub-mode by using the sub-mode selection button 112 of both the terminal to be registered and the hub station. He or she then operates the registration mode ON button 111, thereby initiating the procedure in the control unit 113 (step S21).

The control unit 113 transmits a control signal for the registration mode to the scrambler 80, descrambler 100 and the memories 92, 93 and 94 within its own station, thereby setting the terminal and the substation to the registration mode with the designated sub-mode setting (step S22).

The hub station, when set to the registration mode, transmits a signal notifying the terminal of the completion of change into the registration mode, thus notifying it that preparations for the registration have been made (step S23).

The terminal to be registered that is now set to the registration mode restores the signal and, when the signal is received by the mode switching control circuit 100, transmits the terminal information to the hub station in the set sub-mode of the registration mode (step S24).

The hub station restores the terminal information in the set sub-mode of the registration mode and performs the registration procedure (step S25).

After the completion of the registration procedure, the hub station transmits a signal in the designated sub-mode of the registration mode, informing the terminal of the completion of the registration procedure (step S26).

The terminal restores the signal in the set sub-mode of the registration mode and, when the signal is received by the mode switching control circuit 10, transmits an acknowledgement packet to the hub station in the designated sub-mode of the registration mode (step S27). The terminal then transmits a control signal for the normal mode to the scrambler 80, descrambler 100 and memory 91 of the transmitter and receiver within the terminal, thereby setting the terminal to the normal mode (step S28).

The hub station restores the signal in the set sub-mode of the registration mode and, after the signal is received by the mode switching control circuit 100, is set to the normal mode (step S29). And that is the end of the registration procedure (step S30).

Thus, in the present embodiment, communication between the terminal and the hub station in the radio bus system during the registration procedure is allowed only when the sub-modes set in the transmitting and receiving ends in the registration mode correspond with each other, so that the probability that a malicious terminal standing by in a particular state can be eliminated is high.

Embodiment 3

In Embodiments 1 and 2, the issue of how to ensure secrecy during the registration procedure in the radio bus system was solved. In Embodiment 3, a simplified form of data secrecy can be realized in general radio communications.

Figure 12:
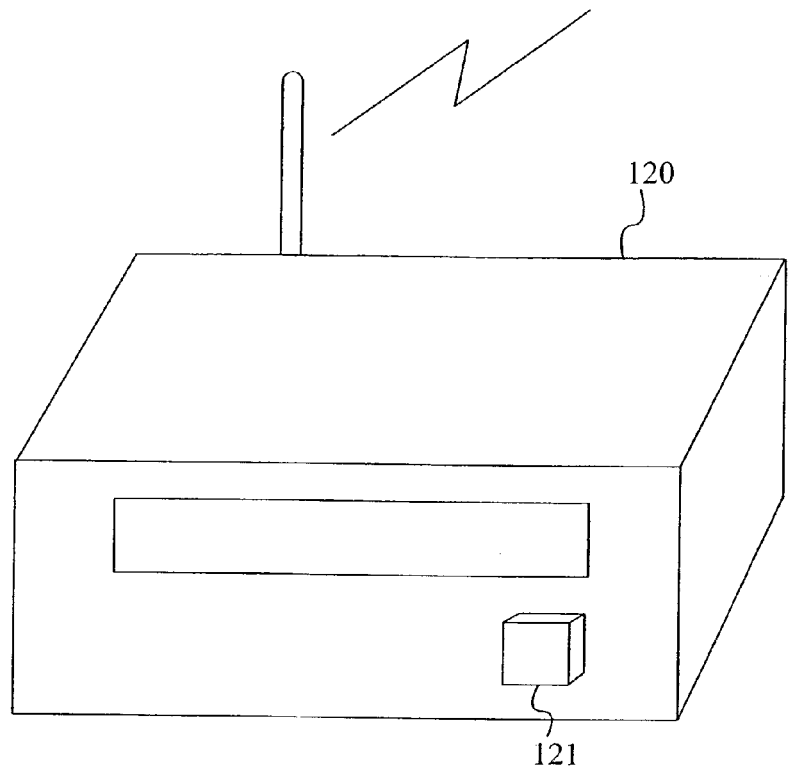
FIG. 12 shows a perspective view of a terminal or a hub station in a radio bus system according to a third embodiment of the present invention.
Figure 13:
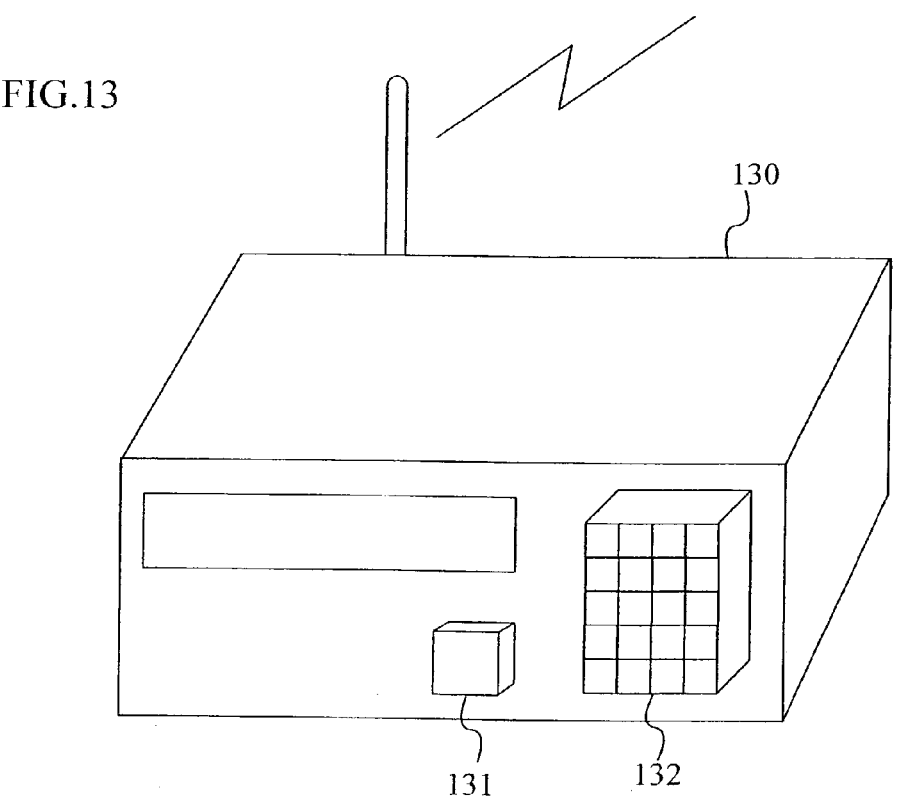
FIG. 13 shows a perspective view of a terminal or a hub station in the radio bus system according to the third embodiment.

FIGS. 12 and 13 show perspective views of either a terminal or a hub station in the radio bus system according to Embodiment 3. FIG. 12 shows an example where the terminal or hub station is applied to the radio bus system according to Embodiment 1, while FIG. 13 shows an example where the terminal or bus station is applied to the radio bus system according to Embodiment 2.

Referring to FIG. 12, numeral 120 designates a hub station or a terminal, and numeral 121 designates a registration mode ON button mounted on the hub station or the terminal 120. The registration mode ON button 121 corresponds to the registration mode ON button 71 in the mode switching control circuit 10 shown in FIG. 5.

Referring to FIG. 13, numeral 130 designates a hub station or a terminal, numeral 131 designates a registration mode ON button mounted on the hub station or terminal 130, and numeral 132 designates a sub-mode selection button comprising a numeric keypad or the like mounted on the hub station or terminal 130. The registration mode ON button 131 corresponds to the registration mode ON button 111 of the mode switching control circuit 100 in FIG. 10, and the sub-mode selection button 132 corresponds to the sub-mode selection button 112.

In order to obtain in the normal mode as well the same effect of enhanced secrecy in the registration procedure in Embodiment 2, in which a plurality of sub-modes were provided in the registration mode, the combinations of the scramblers and the memories storing the preambles that are provided as the sub-modes of the registration mode in Embodiment 2 are made available in the normal mode as well.

Specifically, the control unit 113 in the mode switching control circuit 110 shown in FIG. 10 outputs a control signal to the control signal output terminal 116 such that, in accordance with the setting of the sub-mode selection button 112, a scrambler 80, a corresponding descrambler 100 and a memory of the preamble can be selected in the normal mode as well.

Even when the settings of the sub-mode selection button 112 are the same between the normal and registration modes, the values of the control signal output in these modes do not have to be the same. Further, the sub-mode selection button 112 may be designed such that it can set the normal mode and the registration mode individually. Thus, by enabling the user to select the communication mode as he or she wishes, the level of secrecy in communications in the normal mode can also be enhanced.

While in the above embodiments, the scrambler/descrambler pair and the preamble generating circuit are used in combination, each as a means of identifying the mode, it goes without saying that either one means may be employed and still the desired object can be achieved.

Also, while in the above embodiments, the radio bus system is based on the OFDM system, this is only exemplary and the present invention can be applied to any type of communication system as long as it includes a scrambler for energy spreading purposes, or it is designed such that a preamble to be used for the reproduction of the carrier is provided.

Furthermore, while in the above embodiments the transmitter and the receiver have been described individually, they may share similar components such as the memories 23 and 28.

INDUSTRIAL APPLICABILITY

As described above, since the present invention enables the restoration of received data only when the mode of the terminal and that of the hub station correspond, a minimum level of secrecy can be ensured even when radio is employed during the authentication information registration procedure.

What is claimed is:

1. A registration communication system for a radio bus system comprising:

a single hub station and a plurality of terminals, wherein transmission and reception between said hub station and said terminal are conducted by radio, and wherein said hub station and each of said terminals comprise:

a mode switching means for switching between two modes, namely a registration mode that is used for transmitting or receiving registration data, and a normal mode that is used for transmitting or receiving general data other than said registration data;

a transmission means for transmitting data after performing a predetermined data processing corresponding to the mode switched to; and a reception means for performing a predetermined restoration process on received data corresponding to the mode switched to, wherein restoration of the received data is enabled only when the mode on a transmitting end and that on a receiving end correspond with each other;

said registration communication system being characterized in that, when a terminal performs a procedure for registration in the radio bus system:

said terminal and said hub station are put in the registration mode;

said hub station transmits a notification of completion of registration mode change to said terminal in said registration mode;

said terminal, having received said notification of completion of registration mode change, transmits terminal registration information to said hub station in the registration mode;

said hub station, having received the terminal registration information, performs a registration procedure based on the terminal registration information;

said hub station transmits a notification of completion of a registration procedure to said terminal in said registration mode;

said terminal, having received said notification of completion of said registration procedure, is placed in said normal mode after transmitting recognition data to said hub station in said registration mode; and said hub station, having received said recognition data, is placed in said normal mode.

\* \* \* \* \*